(12) United States Patent
LaDuke et al.

(10) Patent No.: US 8,262,226 B2
(45) Date of Patent: Sep. 11, 2012

(54) APPARATUS AND METHOD FOR AN ANAMORPHIC PEPPER'S GHOST ILLUSION

(75) Inventors: Thomas F. LaDuke, Orange, CA (US); Jose A. Gutierrez, Glendora, CA (US)

(73) Assignee: Disney Enterprises, Inc., Burbank, CA (US)

( * ) Notice: Subject to any disclaimer, the term of this patent is extended or adjusted under 35 U.S.C. 154(b) by 462 days.

(21) Appl. No.: 12/539,280

(22) Filed: Aug. 11, 2009

(65) Prior Publication Data

US 2011/0037952 A1 Feb. 17, 2011

(51) Int. Cl.
*G03B 21/00* (2006.01)
*G03B 21/26* (2006.01)
*G02B 27/22* (2006.01)

(52) U.S. Cl. .............................. 353/10; 353/28; 359/478

(58) Field of Classification Search .................... 353/10, 353/7, 74, 75, 77, 78, 28, 122, 69, 70; 359/451, 359/443, 447, 478, 479; 472/58, 61, 63; 352/48, 49, 86
See application file for complete search history.

(56) References Cited

U.S. PATENT DOCUMENTS

| | | | |
|---|---|---|---|
| 6,481,851 B1 | 11/2002 | McNelley et al. | |
| 6,905,218 B2* | 6/2005 | Courchesne | 353/122 |
| 2004/0135744 A1 | 7/2004 | Bimber et al. | |
| 2004/0233527 A1* | 11/2004 | Palovuori | 359/464 |
| 2006/0181685 A1* | 8/2006 | Hasegawa | 353/69 |
| 2007/0201004 A1* | 8/2007 | O'Connell et al. | 353/10 |
| 2008/0144175 A1* | 6/2008 | Simonsen | 359/479 |

OTHER PUBLICATIONS

Author Unknown, "Anamorphosis," Wikipedia, http//en.wikipedia.org/w/index.php?title=Anamorphosis&printable=yes, 5 pages, at least as early as Apr. 28, 2008.
Author Unknown, "Masters of Deception: Escher, Dail & the Artists of Optical Illusion," BWH Ventures, LLC, http//illusionworks.com/mod/anamorph.htm#, 3 pages, Fall 2004.
Author Unknown, "Pepper's Ghost," Wikipedia, http://en.wikipedia.org/w/index.php?title=Pepper%27s_ghost&printable=yes, 3 pages, at least as early as Apr. 28, 2008.
Author Unknown, "Phantasmechanics Presents Help With Pepper On It," http://www.phantasmechanics.com/pepper.html, 6 pages, at least as early as Apr. 28, 2008.
Author Unknown, "Studierstube Augmented Reality Project," http://studierstube.icg.tu-graz.ac.at/virtualshowcase/, 4 pages, at least as early as Sep. 12, 2008.
Author Unknown, "Two-Way Mirror," Wikipedia, http://en.wikipedia.org/w/index.php?title=Two-way_mirror&printable=yes, 2 pages, at least as early as Apr. 28, 2008.
Bourke, Paul, "Correction of Planar (Stretch) Distortion," http://local.wasp.uwa.edu.au/~pbourke/geometry/distort/, 20 pages, Nov. 1989.
Kent, Phillip, "Anamorph Me!," www.anamorphosis.com, 16 pages, 2001.

(Continued)

*Primary Examiner* — William C Dowling
*Assistant Examiner* — Ryan Howard
(74) *Attorney, Agent, or Firm* — Dorsey & Whitney LLP

(57) ABSTRACT

An assembly and method of generating a Pepper's ghost illusion involving an image generation platform, such as a computer providing an anamorphically-distorted image coupled with some form of display projects an image, directly or indirectly on a spherical medium. The spherical medium reconstitutes the anamorphically-distorted image and generates a Pepper's ghost illusion of the reconstituted anamorphically-distorted image.

20 Claims, 10 Drawing Sheets

OTHER PUBLICATIONS

Kent, Phillip, "Art of Anamorphosis: Links," http://myweb.tiscali.co.uk/artofanamorphosis/links.html, 6 pages, at least as early as Apr. 4, 2008.

Kent, Phillip, "Art of Anamorphosis: Software," http://myweb.tiscali.co.uk/artofanamorphosis/software.html, 4 pages, at least as early as Apr. 4, 2008.

\* cited by examiner

APPARATUS AND METHOD FOR AN ANAMORPHIC PEPPER'S GHOST ILLUSION

FIELD OF THE INVENTION

Aspects of the present disclosure relate to an apparatus and method for a Pepper's ghost illusion and, more particularly, relate to an anamorphic Pepper's ghost illusion.

BACKGROUND

The Pepper's ghost is a well known illusion dating back to the 1800's. The illusion involves the appearance of a three-dimensional object in a location where the object is not physically present. FIG. 1 is a diagram depicting the structure of a classic Pepper's ghost illusion. In this example, the structure involves transparent or at least partially transparent reflective surface 10, such as a sheet of glass or half-silvered mirror, positioned to reflect a three-dimensional object 12 to a viewer 14. The combination of the reflection from the actual object 12 to the viewer 14 causes the object 12 to appear to the viewer 14 as if it is floating in air behind the reflective surface 10 in the location of the ghost object 16. There have been various implementations of the Pepper's ghost illusion since its inception.

Anamorphosis is an image projection technique dating back to the 1400's involving the reconstitution of a distorted projection. FIG. 2 illustrates one example of anamorphosis involving a cylindrical mirror 20 used to view a flat anamorphically-distorted image 22 which, in this example, is a house. The image 22 is distorted in such a way that when viewed in the cylindrical mirror 20, the image 24 appears undistorted. The mirror is a conventional mirror, whether polished metal, glass with an aluminum, silver, or other metal deposition on one side, or the like. Mirrors used in conventional anamorphic imaging are highly reflective or totally reflective to visible light, reflecting all or substantially all visible light incident on the mirror.

SUMMARY

Aspects of the present disclosure involve an anamorphic Pepper's ghost illusion assembly comprising an image generator providing an anamorphic-distorted image. The illusion assembly may further include a curved reflective surface positioned to reflect the anamorphic-distorted image to a spherical medium. The spherical medium is positioned to reconstitute the anamorphic-distorted image, the spherical medium is further arranged to provide a Pepper's ghost illusion of the reconstituted anamorphic-distorted image.

Another aspect of the present disclosure involves a Pepper's ghost illusion assembly including a plurality of image generators configured to project one or more anamorphic-distorted images on a rear projection material. The rear projection material then displays the one or more anamorphic-distorted images projected from the plurality of image generators. Additionally, a spherical medium is located adjacent the rear projection material and the spherical medium is configured to receive the redirected anamorphic-distorted image. The spherical medium reconstitutes the anamorphic-distorted image to provide a Pepper's ghost illusion of the reconstituted anamorphic-distorted images.

Another aspect of the present disclosure involves a method for producing an anamorphic Pepper's ghost illusion. The method involves generating an anamorphic-distorted image, and projecting the anamorphic-distorted image to a structure configured to display the anamorphic-distorted image. The anamorphically-distorted image is then reconstituted using a spherical medium, wherein the reconstituted image is a Pepper's ghost illusion appearing to float mid-air within the spherical medium.

These and other advantages and features of the present disclosure will become apparent to those of ordinary skill in the art upon reading this disclosure in its entirety.

DETAILED DESCRIPTION

Aspects of the present disclosure involve an apparatus and methods for generating an anamorphic Pepper's ghost illusion. Generally, a spherical medium suitable in transparency and reflectivity to generate a Pepper's ghost illusion is positioned adjacent to or otherwise positioned to receive an anamorphic-distorted image. The spherical medium undistorts the anamorphic image and provides the illusion to a viewer.

The spherical medium may be a sphere, a hemisphere, a semisphere, include a portion of a sphere (e.g., more or less of a sphere than a hemisphere) or another spherically or partially spherical shape appropriately arcuate about more than one axis and designed to anamorphically reconstitute or otherwise visually undistort the anamorphic-distorted image. As used herein, the term "anamorphic-distorted image" refers to a distorted image that may be undistorted by way of a suitable medium in conformance with anamorphic techniques.

Aspects of the disclosure involve an improvement to Pepper's ghost illusion where the ghost image is reconstituted by a spherical medium in accordance with anamorphic techniques. The implementation discussed herein provides various advantages including, but not limited to, providing a 360 degree viewing angle around the spherical medium, as well as an ability to view the illusion from below, above, as well as around the sphere.

Figure 1:
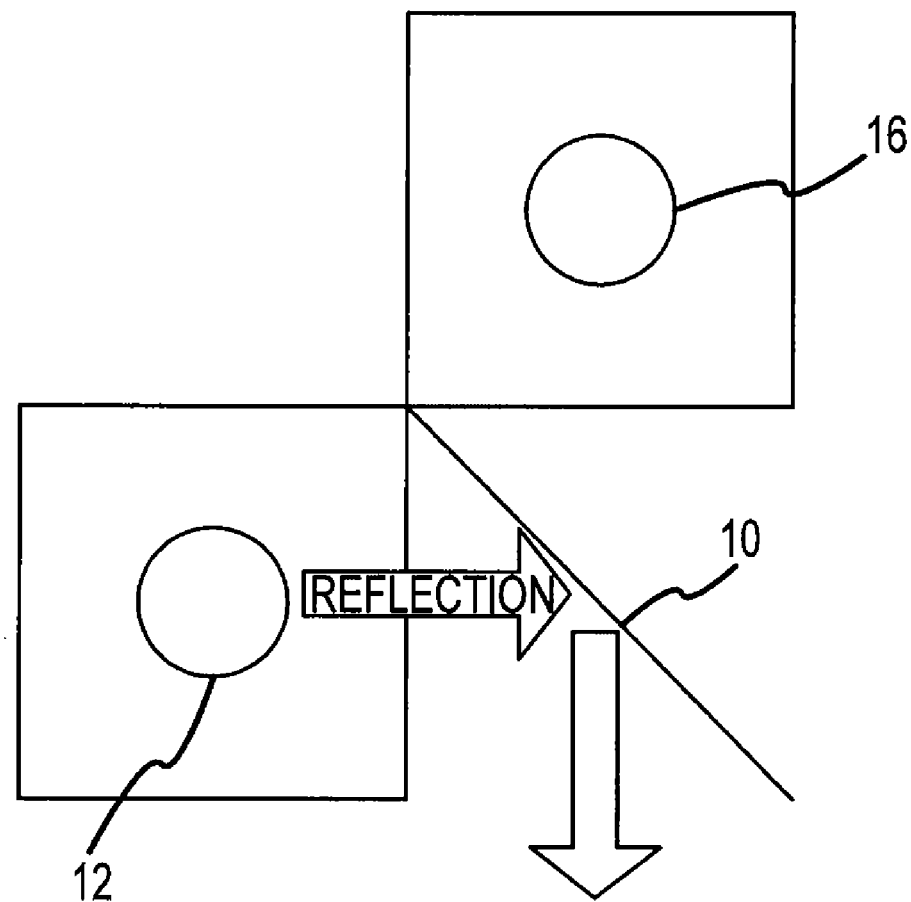
FIG. 1 is a diagram illustrating a conventional arrangement of a structure for producing a Pepper's ghost illusion.
Figure 2:
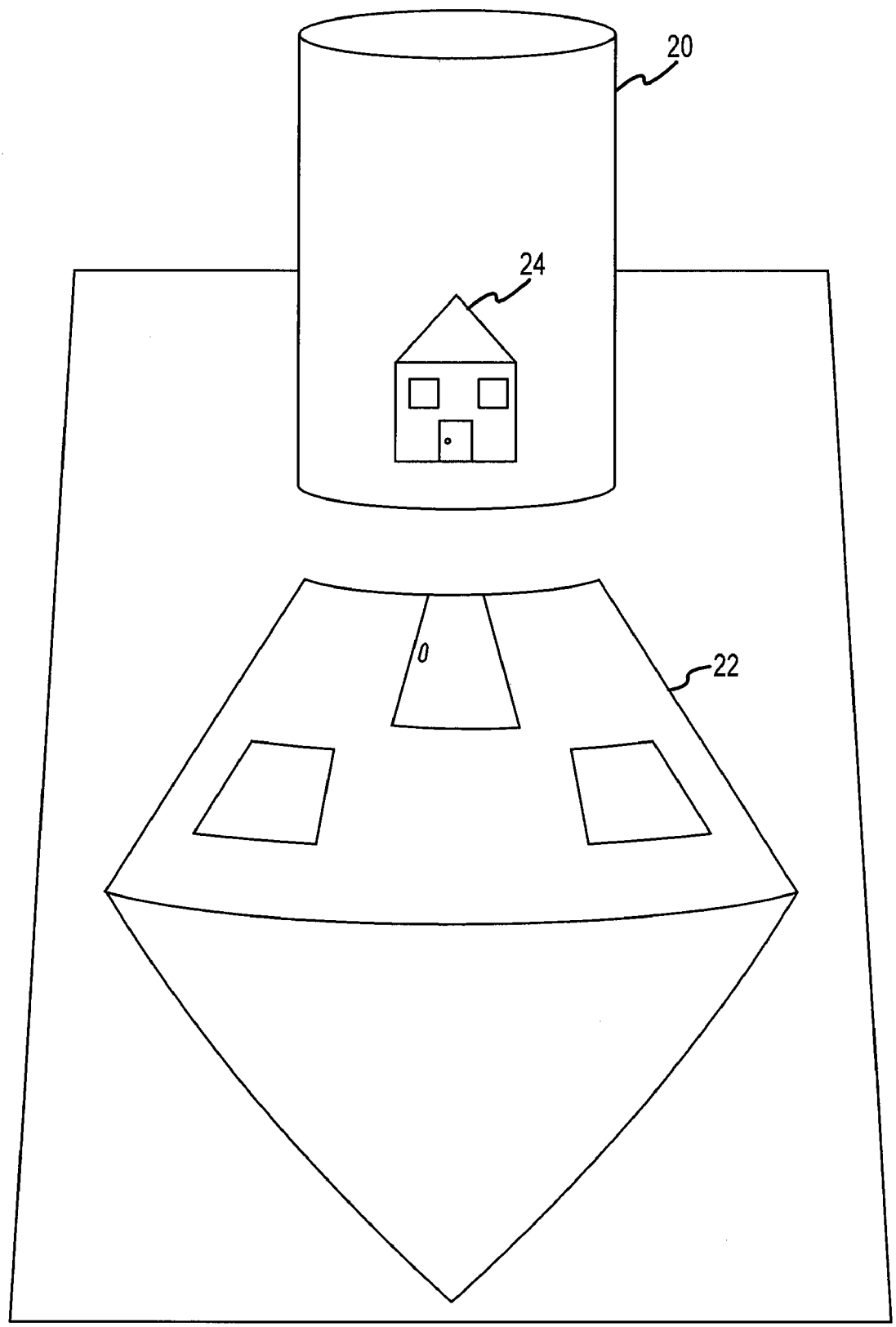
FIG. 2 is a diagram illustrating a conventional arrangement of a structure for anamorphosis.
Figure 3:
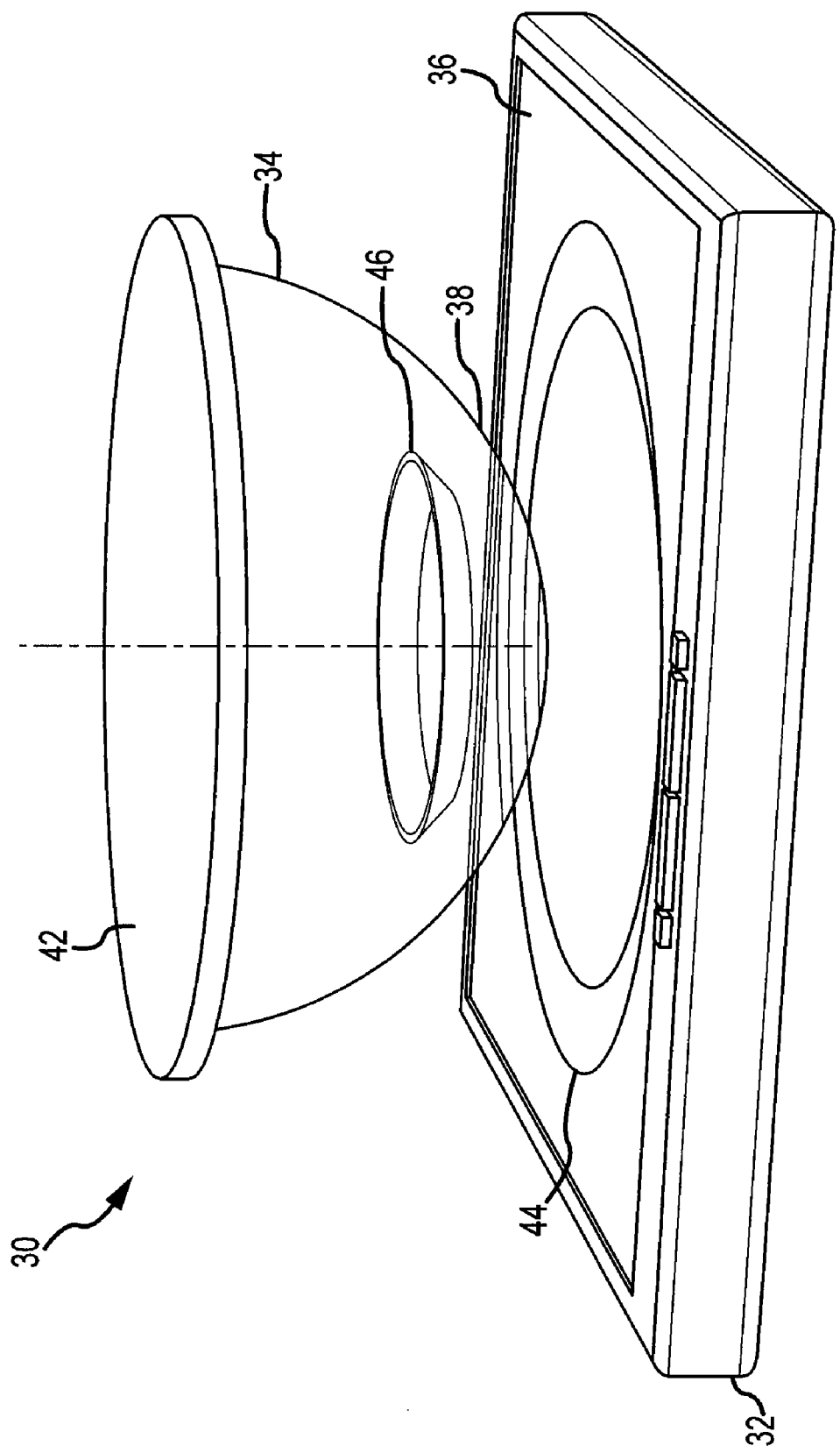
FIG. 3 is an isometric view of a anamorphic Pepper's ghost illusion assembly in accordance with one particular implementation conforming with aspects of the present disclosure.
Figure 4:
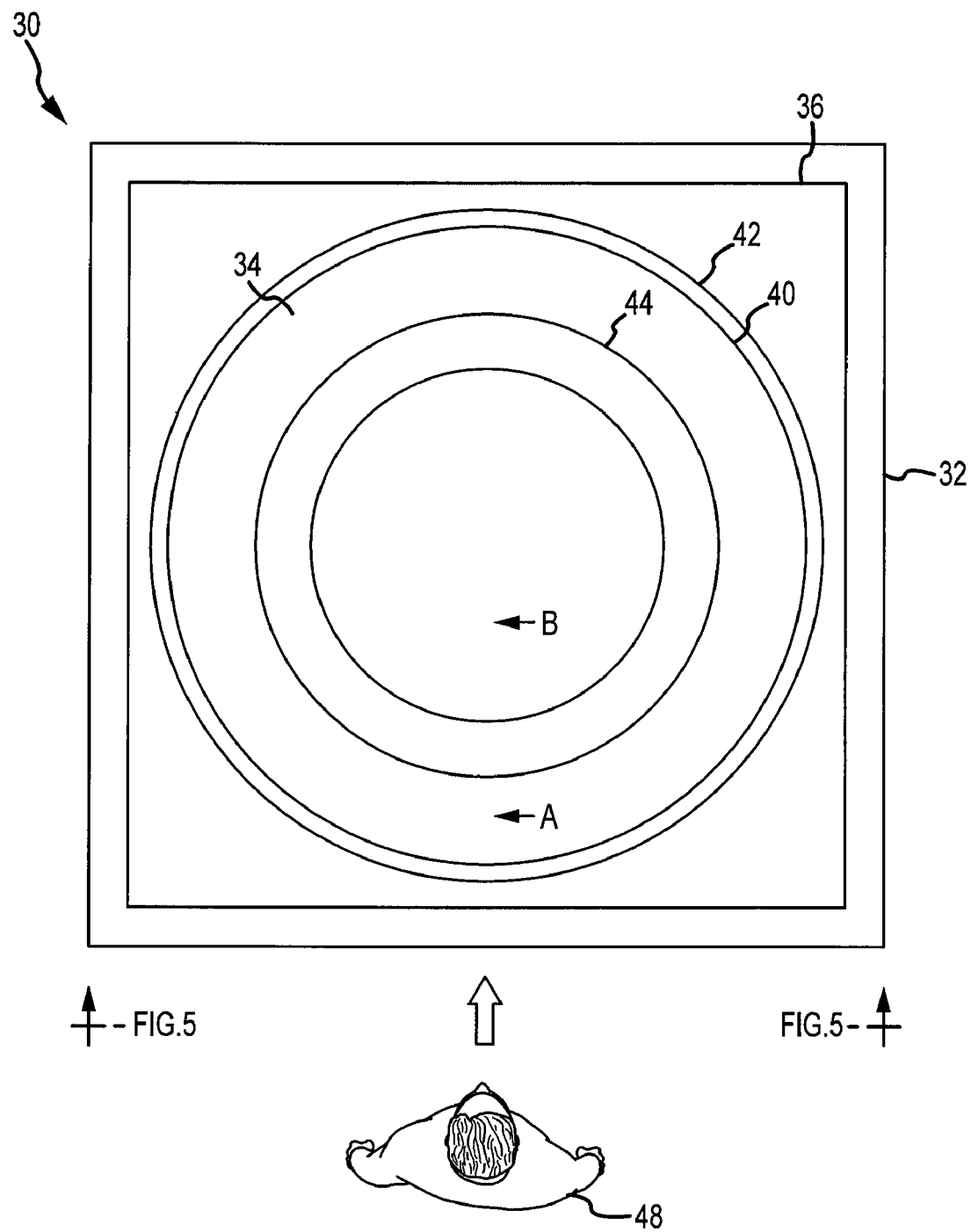
FIG. 4 is a top view of the anamorphic Pepper's ghost illusion assembly of FIG. 3.
Figure 5:
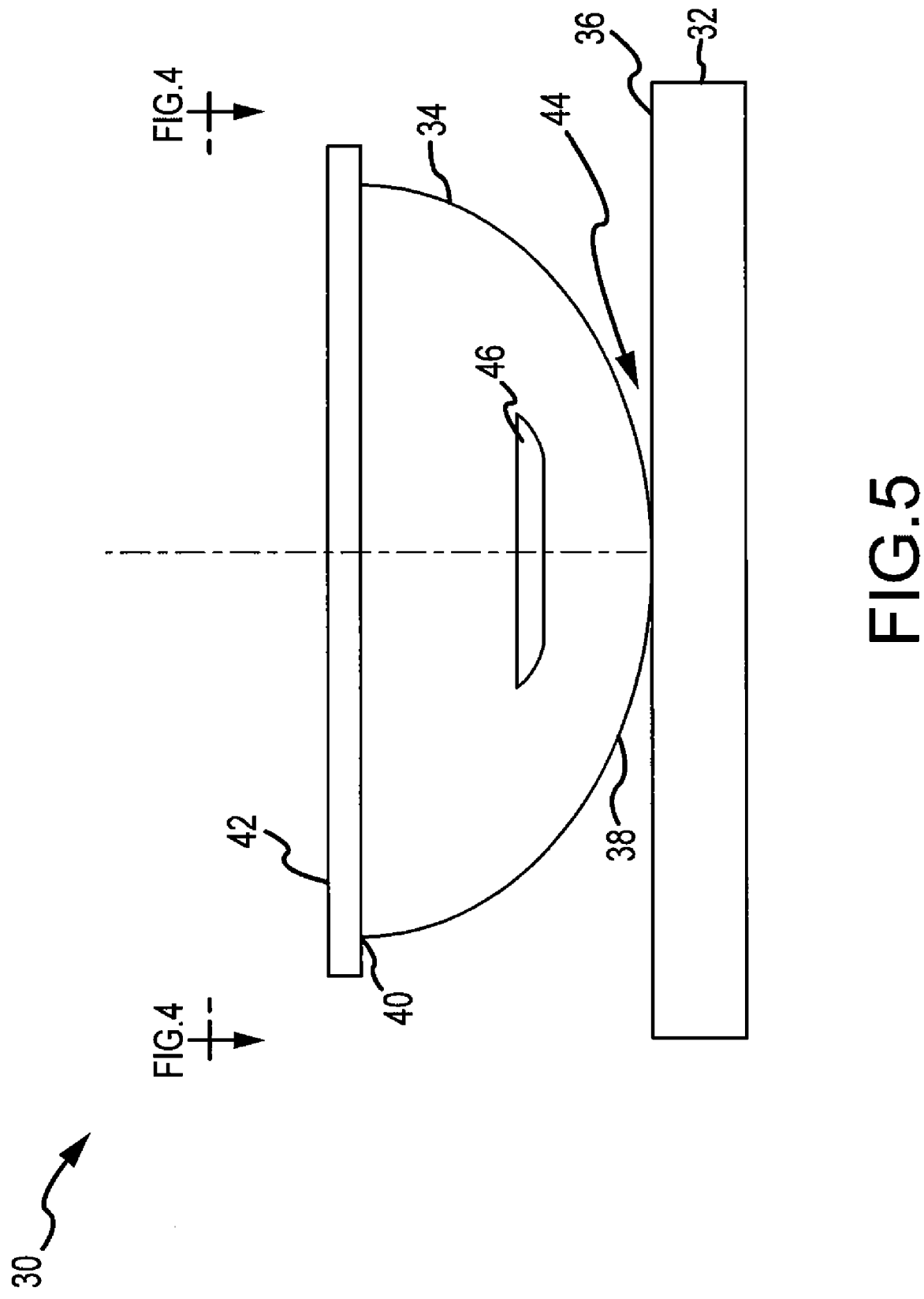
FIG. 5 is a front view of the anamorphic Pepper's ghost illusion assembly of FIG. 3.

FIGS. 3-5 illustrate one particular possible anamorphic Pepper's ghost illusion assembly 30. In this example, an electronic image generator 32 in the form of a flat panel display is configured to display an anamorphic-distorted image. The image generator 32 may be any suitable display or image system, including but not limited to: a liquid crystal display ("LCD"), a plasma display, a light-emitting diode ("LED") display, an organic LED display, a rear projection system, and a front projection system.

The image generator 32 is positioned adjacent to a hemispherical clear plastic medium 34. The terms "medium" and "transmissive and reflective medium," as used herein, are meant to indicate that the medium is both reflective and transparent in a manner sufficient to achieve the Pepper's ghost illusion. Hence, some light passes through the medium and some light is reflected. Examples of suitable transmissive and reflective mediums include glass, clear plastic, acrylic plastic, Plexiglas™, biaxially-oriented polyethylene terephthalate (boPET) polyester (e.g. Mylar™) and similar suitable materials, and half-silvered mirrors, whether solid or in fabricated sections and whether or not coated or infused with tints, reflective or antireflective coatings, and the like, suitable to achieve a Pepper's ghost illusion.

In the particular example set forth in FIGS. 3-5, the image generator 32 is positioned so that a screen 36 of the image generator 32 is perpendicular to the center line (dashed line of FIGS. 3 and 5) of the hemispherical transmissive and reflective medium 34 located over the screen 36. It is possible to angularly orient the image generator relative to the spherical medium 34 with appropriate image distortions to account for the orientation relative to the medium. The hemispherical transmissive and reflective medium 34 includes a lower portion 38 and a circular top edge 40 that may be covered with a cover 42. The cover 42, which may be black or another light absorbing color, absorbs some environmental light and shields the inner area of the medium 34 and display from some environmental light, which enhances the illusion. In an alternative embodiment (not shown) the circular top edge 40 may be used to secure the medium 34 in place. For example, the circular top edge 40 may have threading or flanges to facilitate securing the medium to a ceiling or other surface. The lower portion 38 of the medium 34 may be positioned over the center of the image generator 32.

During operation, the image generator 32 displays or projects a distorted image 44 upwardly toward the hemispherical medium 34. A top-view of the Pepper's ghost assembly 30 is illustrated in FIG. 4. The distorted image 44 displayed on the screen 36 of the image generator 32 may be seen through the medium 34. For the sake of simplicity, the distorted image 44 is a ring. The undistorted anamorphic Pepper's ghost image 46 appears to be inside the hemispherical medium 34 from the perspective of a viewer 48 looking at the spherical medium 34 from a foreground position, as best shown in FIG. 4. In actuality, a portion of the light of the distorted image 44 projected from the screen 36 is reflected by the spherical medium 34 to the viewer 48 who perceives the image 46 to be floating within the spherical medium 34. The distance between the reflective surface 34 and the image generator 32, as well as the size of the projected features, determine the virtual depth of the reflected image. The image generated and image projection size may be adjusted to provide an appropriate size for a given viewing environment.

The Pepper's ghost image 46 that appears within the medium 34, as shown in FIGS. 3 and 5, is undistorted and shown in correct proportion and size. The distorted image 44 is provided in such a way that the hemispherical medium 34 undistorts the image 44 to appear to a viewer 48 the correct proportion and size. Although not easily discernable in the example of a ring, the distorted image 44 is generally curved and elongated depending on the shape and proximity of the spherical medium 34. The elongation of the distorted image increases the further away the distorted image 44 is from the lower portion 38 of the medium 34. Thus, a feature of the distorted image 44 at an area A (FIG. 4) is arcuately elongated to a greater degree than a feature of the distorted image at an area B (FIG. 4).

The generation of the distorted image 44 may be achieved, either directly by an artist or with the assistance of software. One example of a program available to generate a distorted anamorphic image for use in conjunction with a conical shaped medium along with other possible medium configurations is "Anamorph Me!," which is available at www.anamorphosis.com and for which a User's Guide version 0.2 by Phillip Kent is currently available and hereby incorporated by reference herein. The algorithms used by Anamorph Me! may be modified such that they are suitable for use with a spherical medium. Specifically, for example, the algorithms may be modified to account for horizontal curvature and also vertical curvature based on the radius of the spherical medium 34. Anamorphic warping is also discussed at "Correction of Planan (stretch) Distortion" by Paul Bourke, 1989, which is hereby incorporated by reference herein.

Figure 6:
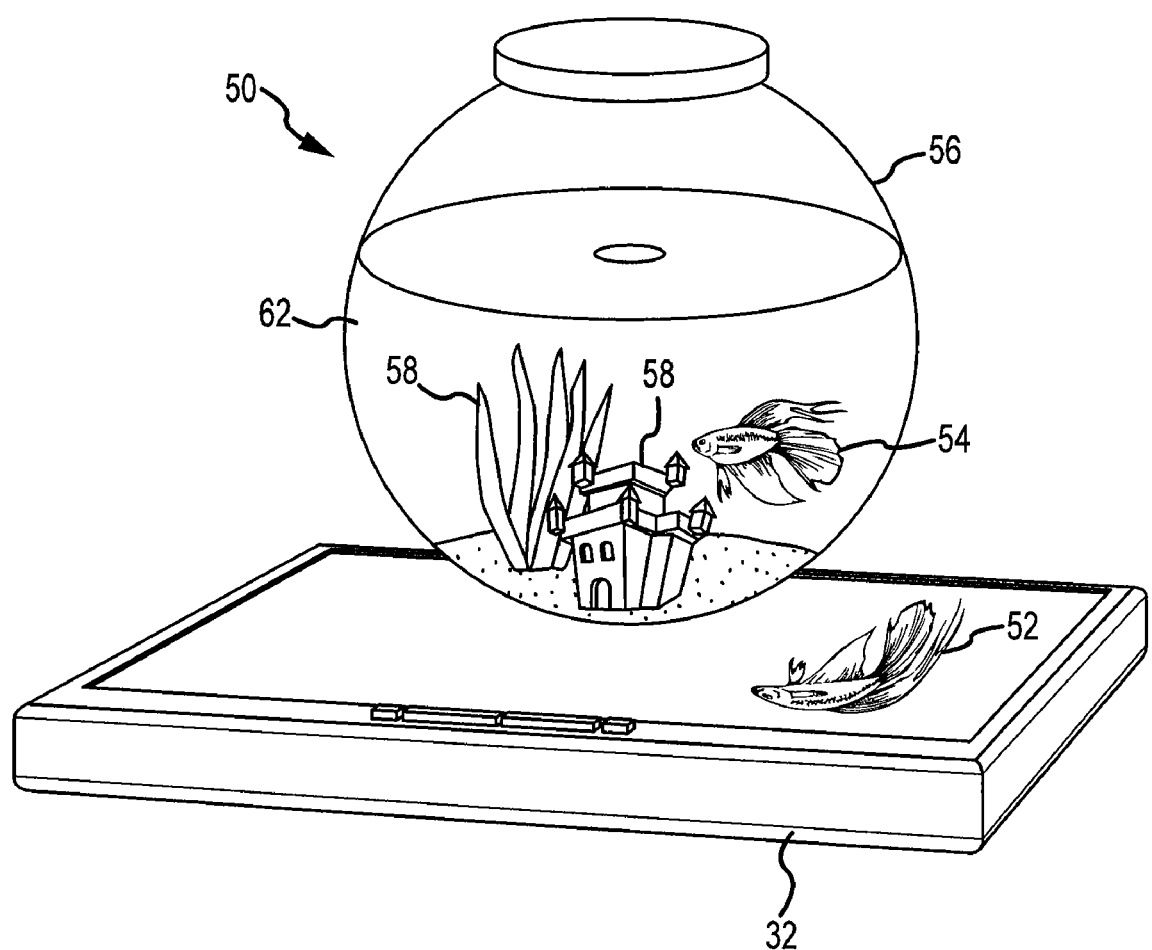
FIG. 6 illustrates an anamorphic Pepper's ghost image assembly having a spherical medium including physical props that the illusion interacts with in accordance with an alternative implementation conforming to aspects of the present disclosure.

The use of the image generator 32 in conjunction with some form of animation, motion picture format or other form of display technology, provides for a moving, undistorted Pepper's ghost image. Hence, it is possible to create an illusion of an undistorted swimming fish, for example. FIG. 6 illustrates a Pepper's ghost assembly 50 that includes an animated distorted image 52 of a fish. As shown, the distorted image 52 of a fish is displayed on the image generator 32 resulting in Pepper's ghost image 54 of the fish within a spherical medium 56. Animation of the Pepper's ghost image 54 of the fish may include swimming around the spherical medium 56 as the distorted image 52 of the fish moves around the image generator 32.

In addition to animating the Pepper's ghost image 54, props 58, such as the illustrated castle and vegetation, may be positioned within the spherical medium 56 and a Pepper's ghost image can "interact" with the props. The castle and vegetation 58 are not generated by the image generator 32 but, rather, are physically located within the spherical medium 56. The Pepper's ghost image 54 of the fish may swim around the castle and vegetation 58 located within the spherical medium 56. When the distorted image 52 of the fish is displayed in the foreground portion of the image generator 32, a viewer will see the illusion of the fish, i.e., the Pepper's ghost image 54, swimming in front of the props 58. This is because when the distorted image 52 is in the foreground of the image generator 32, a portion of the distorted image 52 is reflected off the spherical medium 56 toward the viewer. Further, by providing the distorted image brighter than any props within the medium (the props may be theatrically lit), the reflected undistorted image may have the appearance of being in front of the props. Through brightness and positioning of the distorted image on the display, the Pepper's ghost image 54 of the fish may also be made to seem to disappear as it circles away from the viewer toward the back and reappear as it circles from the back toward the viewer.

In addition to having objects located within the medium 56, the medium 56 may contain liquid 62, such as water, for example. The liquid 62 may be artificially colored, such as with a dye or, alternatively, the image generator 32 may display a background color that would appear to give the liquid 62 color. Additionally, or alternatively, the medium 56 may be tinted a color, such as blue or green, to create a desired effect. Further, the image generator 32 may display effects related to the movement of the liquid 62 such as ripples, waves, and other perturbations to the liquid to the enhance the visual effect of the liquid 62 within the medium 56.

Figure 7:
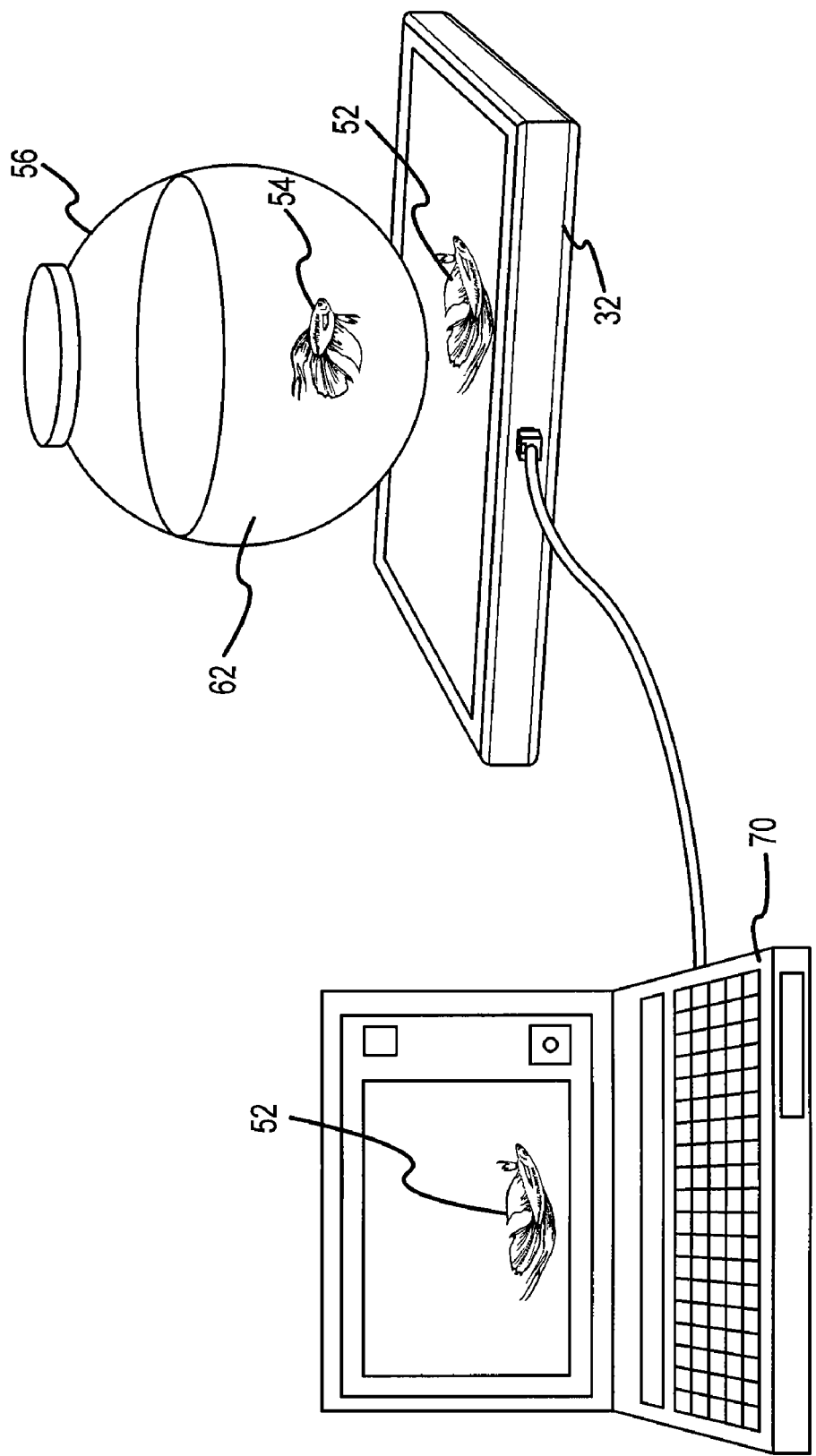
FIG. 7 illustrates a computing system communicatively coupled to the anamorphic Pepper's ghost image assembly of FIG. 6, and particularly a display that displays an anamorphically-distorted image generated by the computing apparatus, in accordance with an embodiment of the present disclosure.

The image generator 32 may be coupled with a computer 70, as illustrated in FIG. 7, configured with suitable image display technology (animation video or live), such as Apple QuickTime™, Windows Media Player™, and any number of other viewers, or some form of playback technology such as a DVD player, Blu-ray Disk® player, etc., configured to statically or dynamically display one or more anamorphic images. Additionally, the computer 70 may be used to create, receive, store, and/or modify anamorphic-distorted image 52 for display by the image generator 32. As such, the computer 70 may be configured with hardware and software to facilitate such functionality. For example, the computer 70 may be configured with software to enable an artist, graphical designer, illustrator, or animator to create and/or modify images for use in the Pepper's ghost illusion. As mentioned above, Anamorph Me! software, or similar programs, may be used to anamorphically-distort an image for display. Additionally, the computer 70 may be configured to read various types of media including DVD, Blu-ray Disk®, flash, compact flash, etc. and store and/or play back the images. Further, the computer 70 may include or be configured to receive data from an image capture device, such as a camera (not shown) that may take still pictures or video images for use in the Pepper's ghost illusion.

In other embodiments (not shown), the computer 70, used to create, capture, store or modify the distorted image, may be separate from the device used to supply the image to an image generator. Specifically, the image or images to be displayed may be stored on a readable media, such as a hard disk drive, a flash drive, and optical storage media, whether integrated with the image generator or in communication therewith. Further, a stand alone media player, such as a DVD player, or a Blu-ray Disk® player, may be coupled to the image generator to provide the image for display by the image generator.

As mentioned above, the image generator 32 discussed with respect to the implementations of FIGS. 3-7 may be a flat panel display. Other image generators, whether deployed in the configurations of FIGS. 3-7 or a different configuration, are possible, including LCD projectors, cathode-ray tube ("CRT") projectors, CRT monitors, digital light processing ("DLP") displays, DLP projectors, field emission displays (FED), plasma displays, RGB LED arrays, rear projector systems, etc. The electronic image generator should be suitable to display an anamorphic image, which may be static, dynamic, or animated. Additionally, the image generator may not necessarily be electronic, as it is also possible to implement an anamorphic Pepper's ghost illusion assembly using a distorted image printed or drawn on paper, plastic, or other suitable medium.

Figure 8:
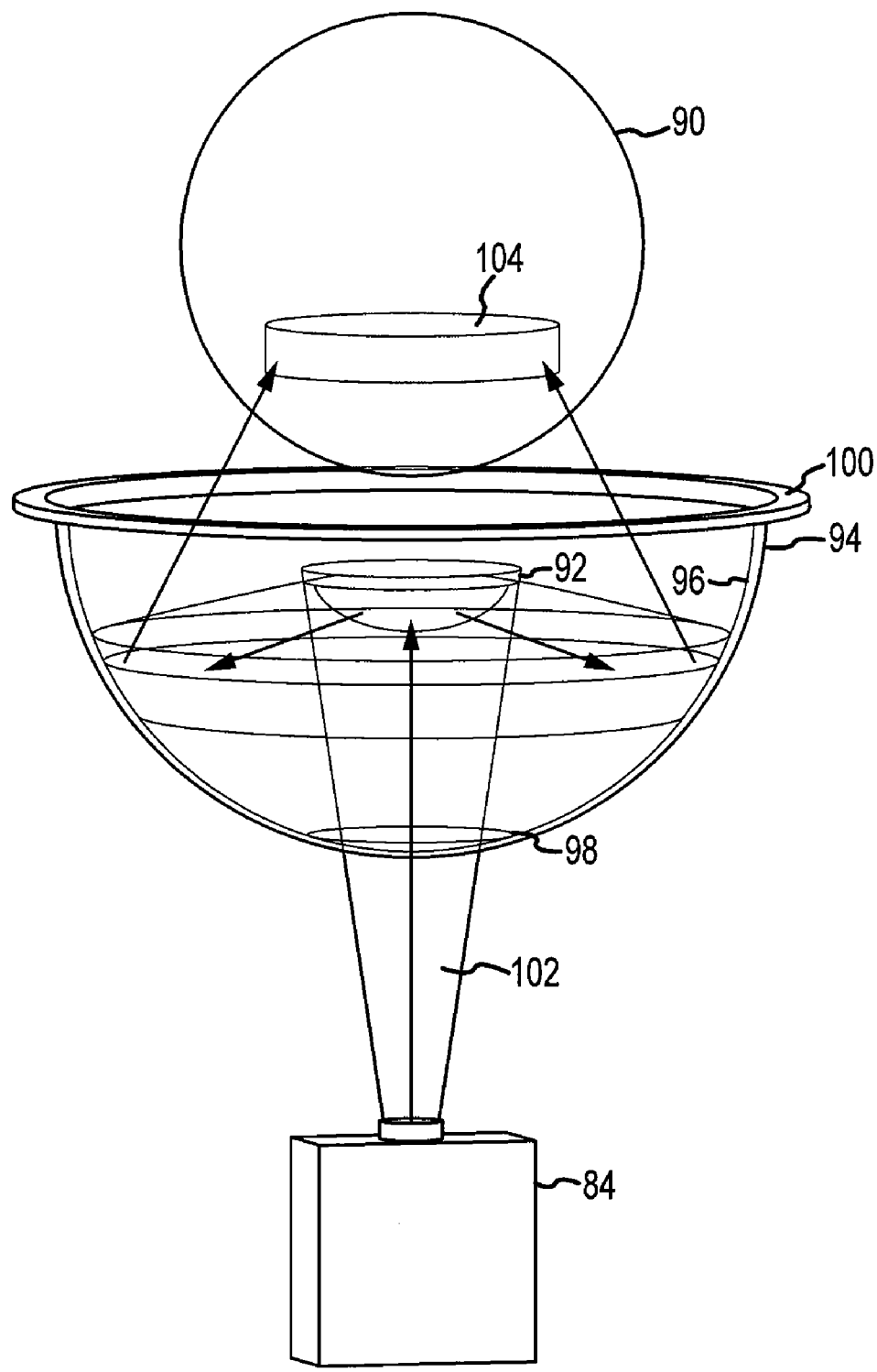
FIG. 8 illustrates an assembly for producing an anamorphic Pepper's ghost illusion, the assembly including a dome mirror positioned to reflect an anamorphically-distorted image from a projector onto a reflective hemisphere, the assembly further including a spherical medium that reconstitutes/undistorts the anamorphically-distorted image from the reflective hemisphere, in accordance with yet another embodiment of the present disclosure.
Figure 9:
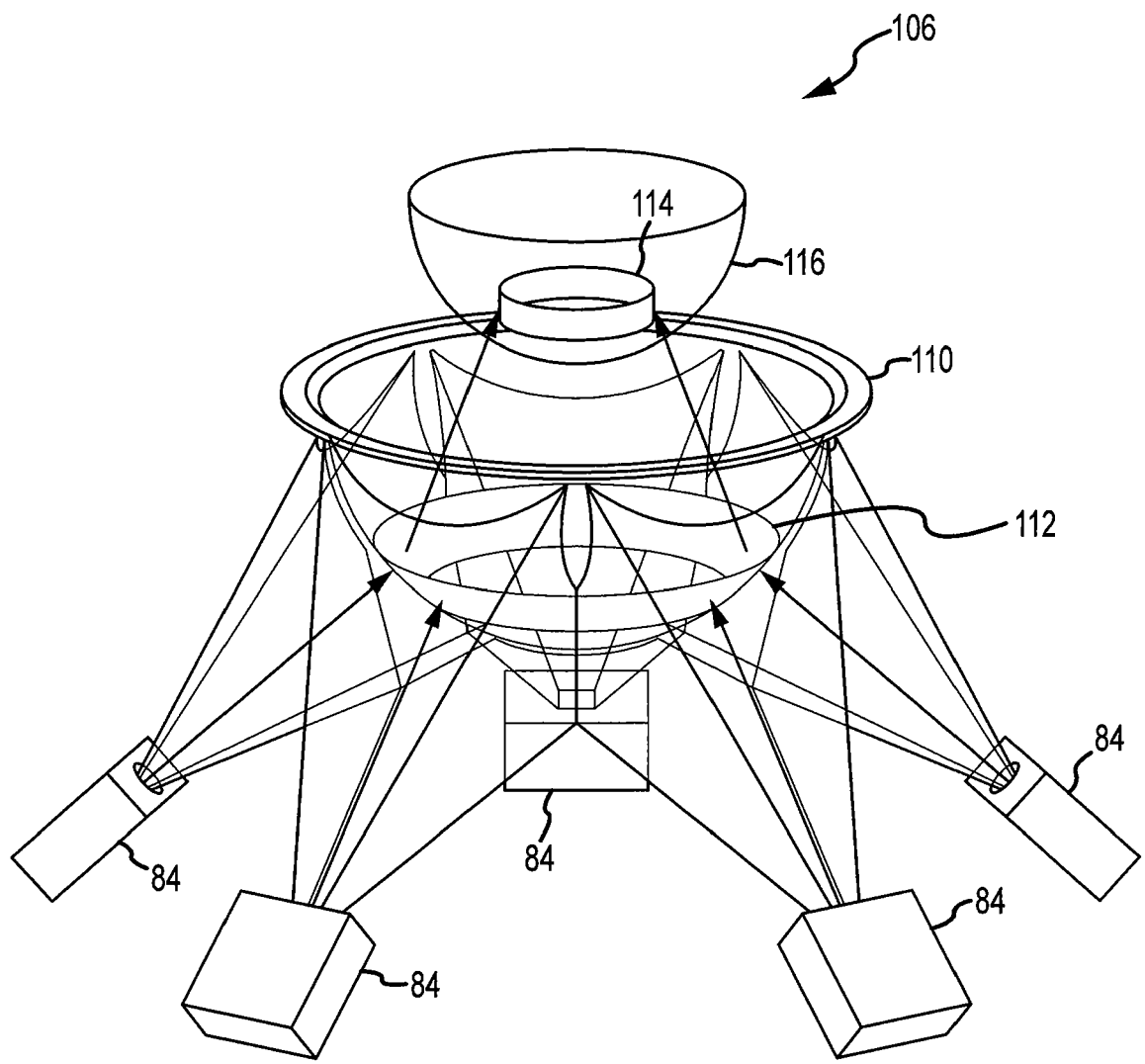
FIG. 9 illustrates a system for producing an anamorphic Pepper's ghost image having a plurality of image display devices in accordance with yet another alternative implementation of the present disclosure.

FIGS. 8-9 illustrate various alternative embodiments implementing projectors as the image generators for anamorphic Pepper's ghost assemblies having a spherical medium in accordance with the present disclosure.

In FIG. 8 multiple, curved reflective surfaces are implemented to create the anamorphic Pepper's ghost illusion. Specifically, a spherical medium 90 is positioned over a dome mirror 92 and a hemispherical front projection screen 94 or other hemispherical surface, suitable to display an image reflected from the dome mirror 92. Hence, hemisphere 94 has a reflective interior surface 96, such as a front projection screen material or coating. The hemisphere further includes a lower aperture 98 and an upper aperture 100. The dome mirror 92 is positioned in the center of the hemisphere 94 over the lower aperture 98. Further, the spherical medium 90 is located over the dome mirror 92 and the upper aperture 100. Generally, the hemisphere 94 may be larger than the sphere 90, and the sphere 90 may be larger than the dome mirror 92.

An anamorphically-distorted image 102 is projected from a projector 84 through the lower aperture 98 toward the dome mirror 92. The distorted image 102 is reflected from the dome mirror 92 to the interior surface 96 of the hemisphere 94 and, subsequently, from the reflective interior surface 96 of the hemisphere 94 through the upper aperture 100 toward the spherical medium 90. The dome mirror 92 and the hemisphere 94 reflect all or nearly all of the light projected from the projector 84. Thus, no light is transmitted through the dome mirror 92 or the hemisphere 94. As can be appreciated, the reflection of the distorted image 102 from the dome mirror 92 and the reflective interior surface 96 of the hemisphere 94 may further distort the distorted image 102. However, the distorted image 102 should be appropriately distorted to account for such additional distortions so that a corrected image 104 appears to float mid-air in the spherical medium 90, as shown. The configuration set out in FIG. 8 would allow a projector 84 to be placed further from the spherical medium 90 then, for example, the implementation set out in FIGS. 3-5.

Each of the anamorphic Pepper's ghost assemblies described herein may be scaled-up or down depending on the characteristics of the environment where they might be employed. Additionally, although only one image generator is shown in each of the foregoing examples, in a larger scale implementation, it would be possible to use more than one image generator. The multiple image generators may be tiled and deployed in a configuration to coordinate display of one or more distorted images. In such an implementation, a distorted image, such as the distorted image 52 (FIG. 6) of the swimming fish, would pass from image generator to image generator in a coordinated fashion. Such a scaled-up assembly would also involve an appropriately dimensioned spherical medium for reflecting the anamorphic image to a viewer.

FIG. 9 illustrates an anamorphic Pepper's ghost assembly 106 having multiple image generators. As shown, five projectors 84 are substantially equally spaced in a circular arrangement below a lower structure 110, illustrated as a hemisphere, so that distorted images projected from adjacent projectors overlap on the lower structure 110. The lower structure 110 may be constructed with an optically transmissive material, such as rear projection material, so that the projected distorted image is transmitted through the lower hemisphere rather than absorbed or reflected. One example of a suitable lower hemisphere material is a translucent polymer sheet, such as polyvinyl chloride (PVC) sheet, for example, that may be supported by a frame or attached, affixed or adhered to a glass or acrylic substrate. Such polymer sheets are widely available commercially under various brand names. For example, Stewart Filmscreen Corporation sells a variety of rear projection materials, such as AeroView 70, that may be suitable for use as the optically transmissive material for the lower structure 110. In one embodiment, each of the projectors 84 project only a portion of a complete distorted image and the overlap of the projected portions provides image continuity for both static images and animated images projected from the projectors 84. For example, each projector 84 projects slightly greater than ⅕ of a distorted ring image 112 shown on the lower structure 110. The overlap of projected images combined with blending techniques provides the ring image to the lower structure 110 without any spaces, gaps, or incongruities. It is also possible to unevenly space the projectors 84 and also overlap the projected images, with suitable image projection and blending techniques employed to ensure that the projected images are coordinated in movement and brightness.

The blending of the overlapping projected images from adjacent projectors 84 may include adjusting the alignment, color, and intensity of the images projected from multiple projectors 84 so the overlap and transition from one projector to another is seamless and not discernable. Generally, the intensity blending may include adjusting the brightness of the projected image progressively downward throughout an overlapping area moving toward the edge of a projected image.

Although the embodiment shown in FIG. 9 illustrates the lower structure 110 as a hemisphere, the lower structure 110 may be provided in other forms, such as an invented pyramid or other multiple (more than one) planar structures, for example. The anamorphically-distorted ring image 112 projected to the lower structure 110 should be appropriately modified to account for the shape of the lower structure 110 so that upon redirection and display of the distorted image 112 on the lower structure 110, a corrected image 114 appears to float mid-air inside a spherical medium 116. For example, if the lower structure 110 includes flat planes of rear projection material, the distorted image 112 should be expanded outwardly from the center of each panel so that it may be properly reconstituted by the spherical medium 116.

In the implementation shown in FIG. 8, only one projector 84 is shown, although additional projectors are possible, whereas in the implementation shown in FIG. 9, a plurality of projectors 84 may be used. The FIG. 8 implementation may be less costly to implement (requiring less projectors as compared with the implementation set out in FIG. 9) and may provide numerous viewing angles relative to the spherical medium 90. However, depending on the size of the reflecting dome 92, image resolution may be less compared to the implementation shown in FIG. 9, where images from numerous projectors may be tiled and hence greater resolution possible with a greater number of projectors. Pixel stretch and tear may differ between the various embodiments, as well. To enhance viewing angles for the implementation shown in FIG. 9, the projectors may be raised as compared to that shown and may also be moved farther from the dome 110, so that viewers looking up toward the dome structures would not block the anamorphically-distorted images being projected. Hence, various changes to any implementation are possible to enhance any particular viewing experience. Further, features from various embodiments may be combined, altered, or rearranged to provide different possible implementations and associated illusion viewing experiences.

Figure 10:
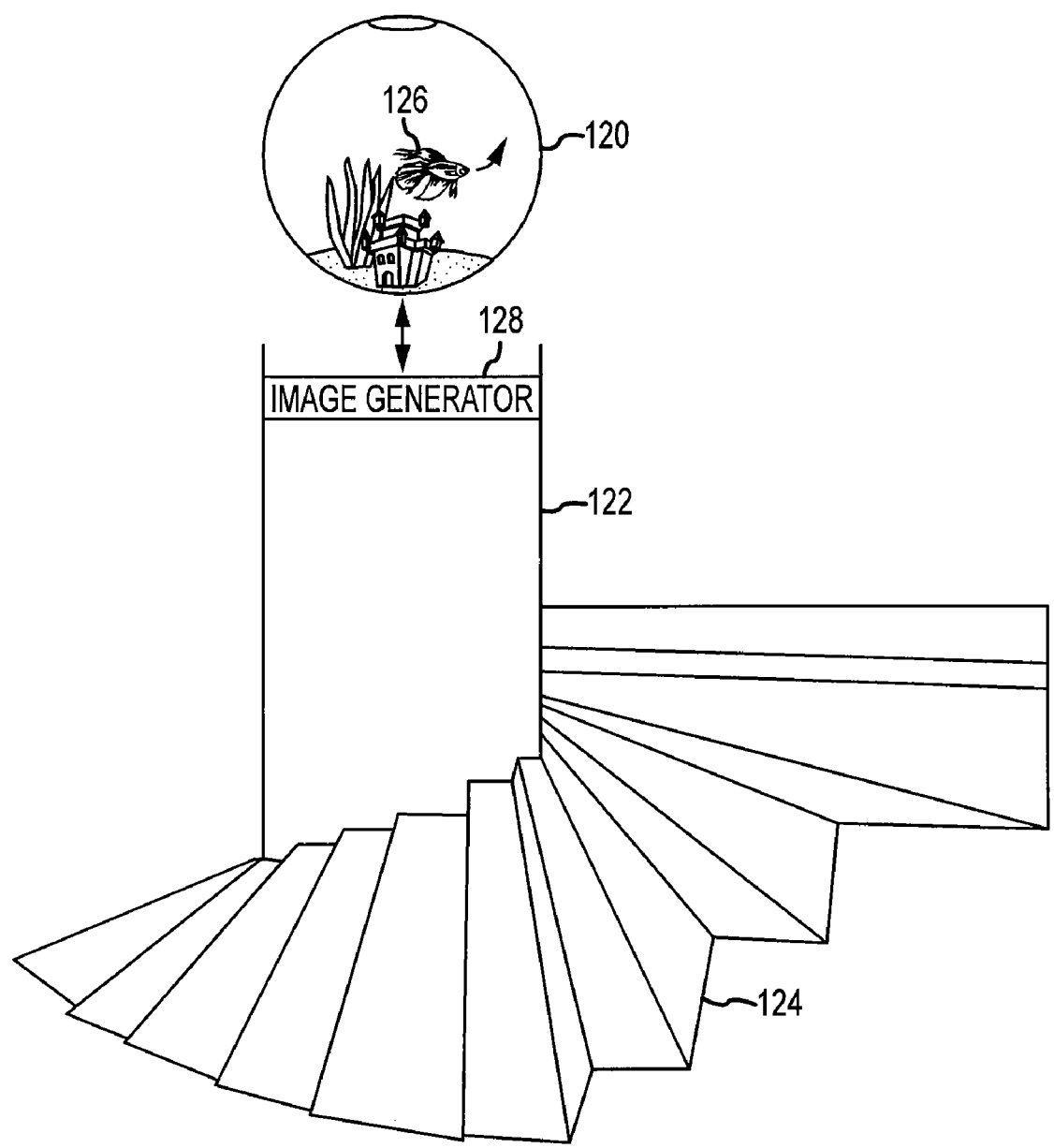
FIG. 10 illustrates an example implementation of an anamorphic Pepper's ghost system having a spherical medium in accordance with an implementation of the present disclosure.

The spherical, hemispherical, or semispherical shape of the mediums in the described embodiments allow the viewer to view the anamorphic Pepper's ghost image from a position above or below the plane of the image generator and up to 360 degrees around the medium. For example, as shown in FIG. 10, the medium 120 may be located at the top of a column 122. A staircase 124 may spiral around the column 122 and a viewer may ascend or descend the staircase 124 while viewing anamorphic images 126 displayed in the medium 120. An image generator 128 and all other component parts other than the medium 120 may be located within the column 122 and hidden from view.

Although the present disclosure has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the disclosure is defined by the appended claims. The various embodiments, operations, components and configurations disclosed herein are generally exemplary rather than limiting in scope.

The invention claimed is:

1. An anamorphic Pepper's ghost illusion assembly comprising:
   an image generator providing one or more anamorphic-distorted images;
   a multidimensional display surface positioned to display the anamorphic-distorted image provided by the image generator; and
   a spherical medium positioned to reconstitute the anamorphic-distorted image displayed by the multidimensional display surface, the spherical medium further arranged to provide a Pepper's ghost illusion of the reconstituted anamorphic-distorted image.

2. The anamorphic Pepper's ghost illusion assembly of claim 1, wherein the spherical medium is a hemisphere.

3. The anamorphic Pepper's ghost illusion assembly of claim 1, wherein the image generator comprises an electronic display operably connected with a computing system configured to generate the anamorphic-distorted image.

4. The anamorphic Pepper's ghost illusion assembly of claim 1, wherein the image generator comprises a projector.

5. The anamorphic Pepper's ghost illusion assembly of claim 3, wherein the anamorphic-distorted-image is animated.

6. The anamorphic Pepper's ghost illusion assembly of claim 1, further comprising a prop located within the spherical medium.

7. The anamorphic Pepper's ghost illusion assembly of claim 1, further comprising a liquid within the spherical medium.

8. The anamorphic Pepper's ghost illusion assembly of claim 1, further comprising a media player coupled to the image generator, the media player being configured to provide the anamorphic-distorted image to the image generator.

9. An anamorphic Pepper's ghost illusion assembly comprising:
   an image generator providing one or more anamorphic-distorted images;
   a multidimensional display surface positioned to display the anamorphic-distorted image provided by the image generator; and
   a spherical medium positioned to reconstitute the anamorphic-distorted image displayed by the multidimensional display surface, the spherical medium further arranged to provide a Pepper's ghost illusion of the reconstituted anamorphic-distorted image,
   wherein the multidimensional display surface comprises an interiorly reflective hemisphere configured to reflect the anamorphic-distorted image to the spherical medium.

10. The anamorphic Pepper's ghost illusion assembly of claim 9, further comprising a dome mirror positioned within the interiorly reflective hemisphere.

11. The anamorphic Pepper's ghost illusion assembly of claim 10, wherein the interiorly reflective hemisphere comprises a lower aperture and an upper aperture, the lower aperture being oriented relative to the image generator to allow light from the image generator to enter the interior of the hemisphere and reflect from the dome mirror onto the display surface, the upper aperture oriented to allow light to exit the display surface towards the spherical medium.

12. An anamorphic Pepper's ghost illusion assembly comprising:
   an image generator providing one or more anamorphic-distorted images;
   a multidimensional display surface positioned to display the anamorphic-distorted image provided by the image generator; and
   a spherical medium positioned to reconstitute the anamorphic-distorted image displayed by the multidimensional display surface, the spherical medium further arranged to provide a Pepper's ghost illusion of the reconstituted anamorphic-distorted image, wherein the multidimensional display surface is hemispherical.

13. An anamorphic Pepper's ghost assembly comprising:
   a plurality of image generators configured to project one or more anamorphic-distorted images;
   a rear projection screen oriented to receive and display the one or more anamorphic-distorted images projected from the plurality of image generators; and
   a spherical medium positioned to receive the displayed anamorphic-distorted image, the spherical medium reconstituting the anamorphic-distorted image to provide a Pepper's ghost illusion of the reconstituted anamorphic-distorted images.

14. The anamorphic Pepper's ghost assembly of claim 13, wherein the one or more anamorphic-distorted images comprise a plurality of anamorphic-distorted images projected from the plurality of image generators to the rear projection screen, the plurality of anamorphic-distorted images overlapping and blended to provide a seamless anamorphic-distorted image on the rear projection screen.

15. The anamorphic Pepper's ghost assembly of claim 14, wherein the one or more anamorphic-distorted images are animated and the plurality of projectors are configured to pass the one or more anamorphic-distorted images as the animation of the anamorphic-distorted images move so that the Pepper's ghost illusion appears to move about the spherical medium.

16. An anamorphic Pepper's ghost assembly comprising:
   a plurality of image generators configured to project one or more anamorphic-distorted images;
   a rear projection screen oriented to receive and display the one or more anamorphic-distorted images projected from the plurality of image generators; and
   a spherical medium positioned to receive the displayed anamorphic-distorted image, the spherical medium reconstituting the anamorphic-distorted image to provide a Pepper's ghost illusion of the reconstituted anamorphic-distorted images, wherein the rear projection screen is hemispherical.

17. A method for producing an anamorphic Pepper's ghost illusion comprising:
   generating an anamorphic-distorted image;
   projecting the anamorphic-distorted image to a structure configured to display the anamorphic-distorted image; and
   reconstituting the distorted anamorphic-distorted image using a spherical medium, wherein the reconstituted image is a Pepper's ghost illusion appearing to float within the spherical medium.

18. The method for producing the anamorphic Pepper's ghost illusion system of claim 17, wherein the structure comprises a rear projection material or a front projection material, either material configured to display the projected image such that the spherical medium can reflect the reconstituted image.

19. The method of claim 17 further comprising generating a computer based animation of the anamorphic-distorted image, the spherical medium including one or more physical props, the reconstituted computer based animation of the anamorphic-distorted image interacting with the props.

20. A method for producing an anamorphic Pepper's ghost illusion comprising:
   generating an anamorphic-distorted image;
   projecting the anamorphic-distorted image to a structure configured to display the anamorphic-distorted image;
   reconstituting the distorted anamorphic-distorted image using a spherical medium, wherein the reconstituted image is a Pepper's ghost illusion appearing to float within the spherical medium; and
   projecting the anamorphic-distorted image to a dome mirror through an aperture in a hemispherical structure having an interior reflective surface, the anamorphic-distorted image reflecting from the dome mirror to the structure configured to display the anamorphic-distorted image.

* * * * *